May 5, 1931.  D. H. O'MEARA  1,803,483
MAGNIFYING MEASURING INSTRUMENT
Filed Oct. 27, 1927
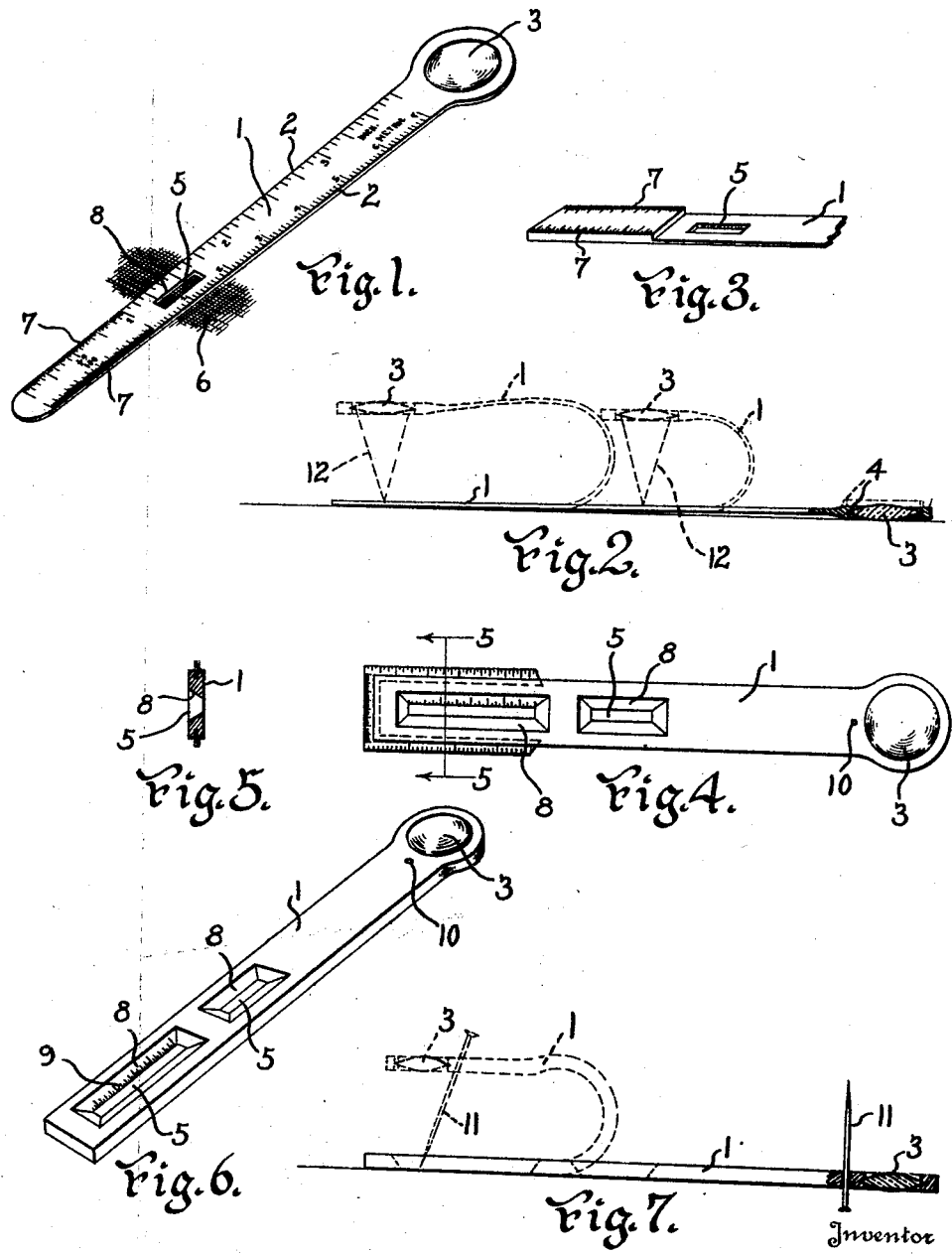
Inventor
Denis H. O'Meara.
By Harry H. Styll
Attorney Patented May 5, 1931

1,803,483

UNITED STATES PATENT OFFICE

DENIS HENRY O'MEARA, OF DETROIT, MICHIGAN, ASSIGNOR TO AMERICAN OPTICAL COMPANY, OF SOUTHBRIDGE, MASSACHUSETTS, A VOLUNTARY ASSOCIATION OF MASSACHUSETTS

MAGNIFYING MEASURING INSTRUMENT

Application filed October 27, 1927. Serial No. 229,062.

This invention relates to improvements in magnifying measuring instruments and has particular reference to a pliable or bendable measuring instrument wherein the magnifying lens may be brought to measuring position through the flexibility of the device.

The principal object of the invention is to provide a flexible measuring instrument wherein a magnifying lens may be brought to measuring position through the flexibility of the device itself.

Another object of the invention is to provide improved means for counting the threads of fabric such as linen, etc.

Another object is to provide improved means for measuring minute scale markings such as 64ths or one-hundredths of an inch.

Another object of the invention is to provide such a measuring device with magnetic means for picking up magnetically attracted objects.

Another object of the invention is to provide a flexible magnifying measuring instrument compact in size so that it may be carried in the pocket.

Another object of the invention is to provide improved means for counting the magnified threads of the fabric.

Other objects and advantages of the invention will be apparent from the following description taken in connection with the accompanying drawings and it will be understood that many changes in the arrangements of parts and details of construction may be made without departing from the spirit of the invention as expressed in the accompanying claims. I, therefore, do not wish to be limited to the exact arrangements of parts and details of construction shown, the preferred forms only having been shown by way of illustration.

Referring to the drawings:

Fig. 1 is a perspective view showing the arrangement of the measuring and magnifying parts of the invention;

Fig. 2 is a side view of Fig. 1 shown partly in section, the dotted lines showing the flexibility of the device and the means for using the same;

Fig. 3 is a partial perspective view showing the magnetized end portion of the device;

Fig. 4 is a top or plan view of a modification;

Fig. 5 is a cross section on line 5—5 of Fig. 4;

Fig. 6 is a perspective of another modification;

Fig. 7 is a side view of Fig. 6 partially in section and showing in dotted lines the flexible movement of the magnifying means.

Referring to the drawings wherein similar characters of reference denote corresponding parts throughout, a thin flexible rule or measuring base portion 1, preferably made of spring steel, is provided with scale markings 2 in any desired form. One end of the base portion 1 is enlarged to carry a magnifying lens 3 which is secured to the base portion 1 by means of the flanged lip 4 shown in Fig. 2, or by any other usual means of mounting lenses. In devices of this character the lenses are usually spun in as indicated in Fig. 2. A perforation or slot 5 is cut in an internal portion of the base member 1 intermediate its ends. This slot 5 may be of definite length and located abreast of the scale markings 2; for instance, it may be one-half inch in length so that when laid on a piece of fabric 6 the number of threads in the space 5 may be counted when the lens 3 is placed thereover, as will be described hereafter. The end of the base portion 1 opposite from the lens 3 may be divided into minute markings, such as one-sixty-fourth or one-one-hundredth of an inch. This is indicated by 7, the sixty-fourths being on the left side and the hundredths on the right side of Fig. 1. If desired the end adjacent the portion 7 may be magnetized so that the scale may be made to pick up articles that are attracted through magnetism, or the end portion at 7 may be thickened as shown in Fig. 3 and the thickened portion magnetized. The sides of the slot 5 may be bevelled as shown at 8 to aid in reading the number of threads of the fabric embraced in the space 5 when counting the number of threads in a given space of the fabric.

If desired the bevel portion 8 of the slot 5 may be marked with a scale as shown at 9 in Fig. 6 and there may be a plurality of slots 5 as shown in Fig. 6. If desired the base 1 may be made of rubber or like flexible material instead of steel. The forms shown in Fig. 4 and Fig. 6 are preferably made of rubber or similar material. The scale markings may be applied to the base 1 in any desired arrangement as shown in Fig. 4 and Fig. 5. In Fig. 6 the numeral 10 designates a pin opening through which may be inserted the pin 11 as shown in Fig. 7.

The operation of the device is best shown in Fig. 2 and Fig. 7. The base 1 being flexible the measure may be bent up as indicated by the dotted lines in Fig. 2 so that the lens 3 may be brought over the desired portion of the scale; as for instance, to the position indicated on the left hand side of Fig. 2, where the lens is located over the minute scale measures indicated by 7 so that the 64ths or hundredths of an inch are magnified and these distances may be read off or it may be thrown over the slot 5 as indicated by the position in dotted lines on the right hand side of Fig. 2 so that the number of threads of the fabric under the scale may be counted. The end being magnetized small steel or iron articles may be picked up, such as screws, etc., or in the case of steel screws or the like they may be held on the scale by magnetism while the number of threads are being counted.

In Fig. 7 the arrangement of the pin 11 is shown. This pin 11 may be used as a counter to count the number of threads in the fabric within the space 5 or the pin being pointed may be stuck into the scale if the scale is made of rubber or like material to hold the bent over portion of the rule 1 in related position for use of the magnifying lens 3. It will also be understood that the focal length of the magnifying lens 3 indicated by the dotted lines 12 in Fig. 2 is calculated and arranged so as to give the proper magnification when the portion of the scale is bent over for use with the unbent portion.

From the foregoing it will be seen that I have devised a very simple, efficient and economical instrument for carrying out all of the objects of the invention, wherein the scale carries its own magnifying device and particularly wherein measurements of circular or irregular shape may be made. The rule being flexible may be fitted around curved or irregular shapes.

Having described my invention, I claim:

1. In a measuring device, a flexible measuring portion having measuring markings and a lens mounted thereon adapted to be aligned with selected portions of the measuring portion by bending the measuring portion to bring the lens over the desired portion.

2. In a measuring device, a flexible measuring portion having measuring markings, a slot intermediate its ends and a lens mounted thereon and adapted to be aligned with the slot by bending the measuring portion to bring the lens over the slot.

3. In a measuring device, a flexible measuring portion having a finely subdivided scale adjacent one end thereof and a lens mounted thereon adapted to be aligned with the said scale by bending the measuring portion to bring the lens over the said scale.

4. In a magnifying device, a resilient blade portion relatively long and relatively thin having a recess adapted to hold articles to be magnified, a lens mounted on the blade and adapted to be aligned with the holding recess of the blade by bending the blade to bring the lens over the holding recess.

5. In a magnifying device, a resilient blade portion relatively long and relatively thin having means for holding an article to be magnified, a lens mounted thereon and adapted to be aligned with the means for holding the article to be magnified by bending the blade to bring the lens over the means for holding the article to be magnified.

6. In a device of the character described, a resilient blade member relatively long and relatively thin and normally having its material lying in a single plane when undeflected and a lens mounted thereon adjacent one end, said lens being adapted to overlie a portion of the blade by bending the same.

DENIS HENRY O'MEARA.